United States Patent

[11] 3,609,034

| [72] | Inventor | Yar W. Mocuik |
| --- | --- | --- |
| | | 66 Hazelton Road, Yonkers, N.Y. 10710 |
| [21] | Appl. No. | 821,622 |
| [22] | Filed | May 5, 1969 |
| [45] | Patented | Sept. 28, 1971 |

[54] METHOD AND APPARATUS FOR TREATING FILM
16 Claims, 4 Drawing Figs.

| [52] | U.S. Cl. | 355/30 |
| --- | --- | --- |
| [51] | Int. Cl. | G03b |
| [50] | Field of Search | 355/30; 95/1, 89 |

[56] References Cited
UNITED STATES PATENTS

| 2,395,397 | 2/1946 | Croft | 15/7 |
| --- | --- | --- | --- |
| 2,644,261 | 7/1953 | Goetz | 95/1 X |

Primary Examiner—John M. Horan
Attorney—Burton L. Lilling

ABSTRACT: Method and apparatus for treating film, wherein the apparatus comprises a plurality of baths for treating the celluloid and emulsion sides of a film, and wherein each bath comprises an assembly of treating wheels constructed and arranged to present a meniscus of treating fluid to the surfaces of the film. The method comprises at least the steps of exposing the celluloid side of the film to a meniscus of fluid to remove scratches from that surface, exposing the emulsion side to a meniscus of fluid, and then drying the film to fill in any abrasions surface marks, and the like.

INVENTOR
YAR W. MOCIUK

BY [signature]
ATTORNEY

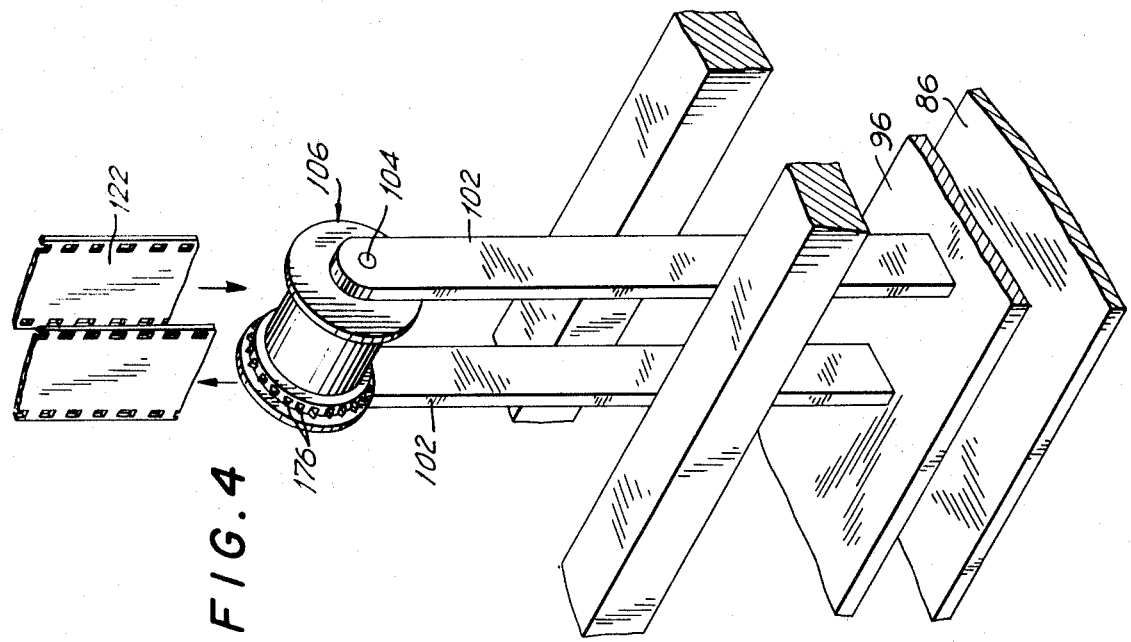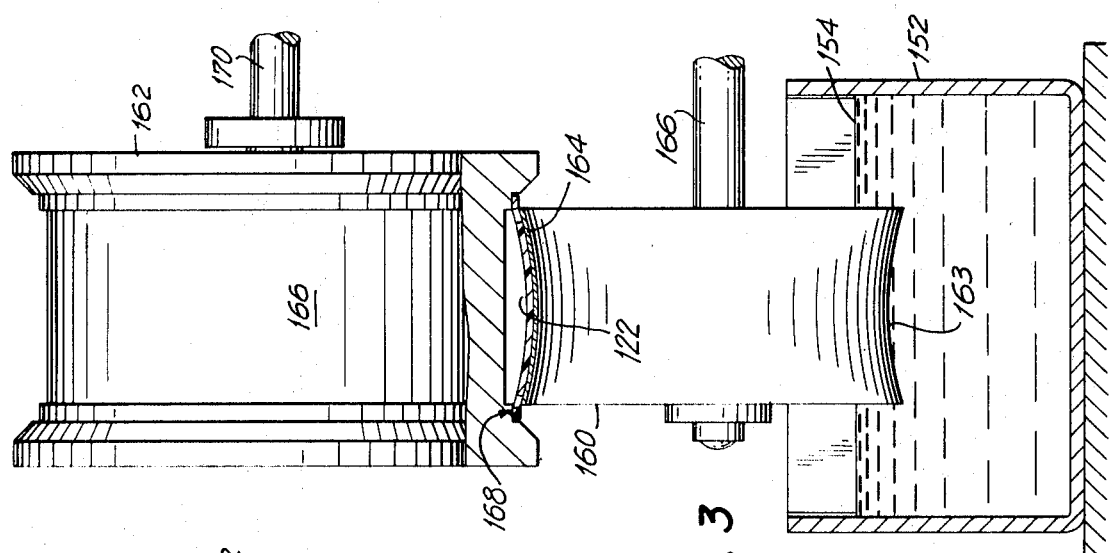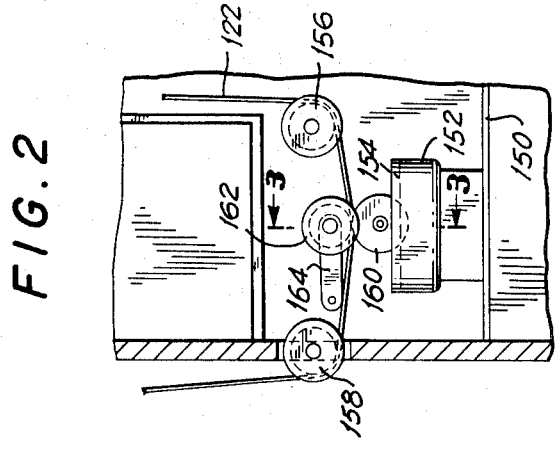

3,609,034

METHOD AND APPARATUS FOR TREATING FILM

BACKGROUND OF THE INVENTION

Developed films that are used many times and subjected to repeated showings frequently are treated between such showings particularly with a view towards removing the dirt that accumulates on the celluloid and emulsion sides thereof, and especially with a view towards removing and filling in abrasions, surface marks, scratches, and the like.

Accordingly, it is a primary object of the present invention to provide method and apparatus for treating film, wherein the apparatus comprises a plurality of baths for treating the celluloid and emulsion sides of a film, and wherein each bath comprises an assembly of treating wheels constructed and arranged to present a meniscus of treating fluid to the surfaces thereof.

It is a further object of the present invention, in addition to the foregoing objects, to provide method and apparatus for treating film, wherein the method comprises at least the steps of exposing the celluloid side of the film to a meniscus of fluid to remove scratches from that surface, exposing the emulsion side to a meniscus of fluid, and then drying the film to fill in any abrasions, surface marks, scratches, and the like.

A further primary object of the present invention, in addition to each of the foregoing objects, is to provide method and apparatus for treating film, wherein the apparatus comprises means for removing dirt from the surfaces of the film, and a plurality of treating baths each comprising an assembly of treating wheels constructed and arranged to present a meniscus of treating fluid to the surfaces of the film. One assembly of treating wheels presenting a meniscus of treating fluid to the celluloid side of the film to remove abrasions, surface marks, scratches and the like from that surface, and the other assembly of treating wheels presenting a meniscus of fluid to the emulsion side of the film enabling any abrasions, surface marks, scratches and the like on the emulsion side of the film to be filled in when the film is dried.

Yet another primary object of the present invention, in addition to each of the foregoing objects, is to provide method and apparatus for treating film, wherein the method comprises at least the steps of removing dirt from the celluloid and emulsion sides of the film, exposing the celluloid side of the film to a meniscus of fluid to remove scratches, abrasions, and surface marks from the celluloid side, exposing the emulsion side to a meniscus of fluid and then drying the film to fill in any abrasions, surface marks, scratches, and the like on the emulsion side thereof.

Still further, it is a primary object of the present invention, in addition to each of the foregoing objects, to provide method and apparatus for treating film, wherein the method comprises at least the steps of removing the dirt from the celluloid and emulsion sides of a film, exposing the celluloid side of the film to a celluloid dissolving chemical bath to melt the top layer of celluloid, enabling scratches, abrasions, surface marks, and the like to be removed from the celluloid side of the film, drying the film, exposing the emulsion side of the film to an emulsion swelling bath, and then drying the film to throw in any scratches, abrasions, surface marks, and the like on the emulsion side of the film.

These and other objects, features and advantages of the present invention, will become more apparent when considered in conjunction with the following detailed description and accompanying drawings.

BRIEF DESCRIPTION OF THE DRAWINGS

In the drawings:

FIG. 2 is a detail in elevation of one of the treating baths shown in FIG. 1, drawn to an enlarged scale;

FIG. 3 is a cross-sectional view, drawn to an exaggerated scale taken along the line 3—3 of FIG. 2; and FIG. 4 is a partial isometric detail, drawn to an enlarged scale, of another feature of apparatus for treating film constructed in accordance with the principles of the present invention.

DESCRIPTION OF THE PREFERRED EMBODIMENTS

Figure 1:
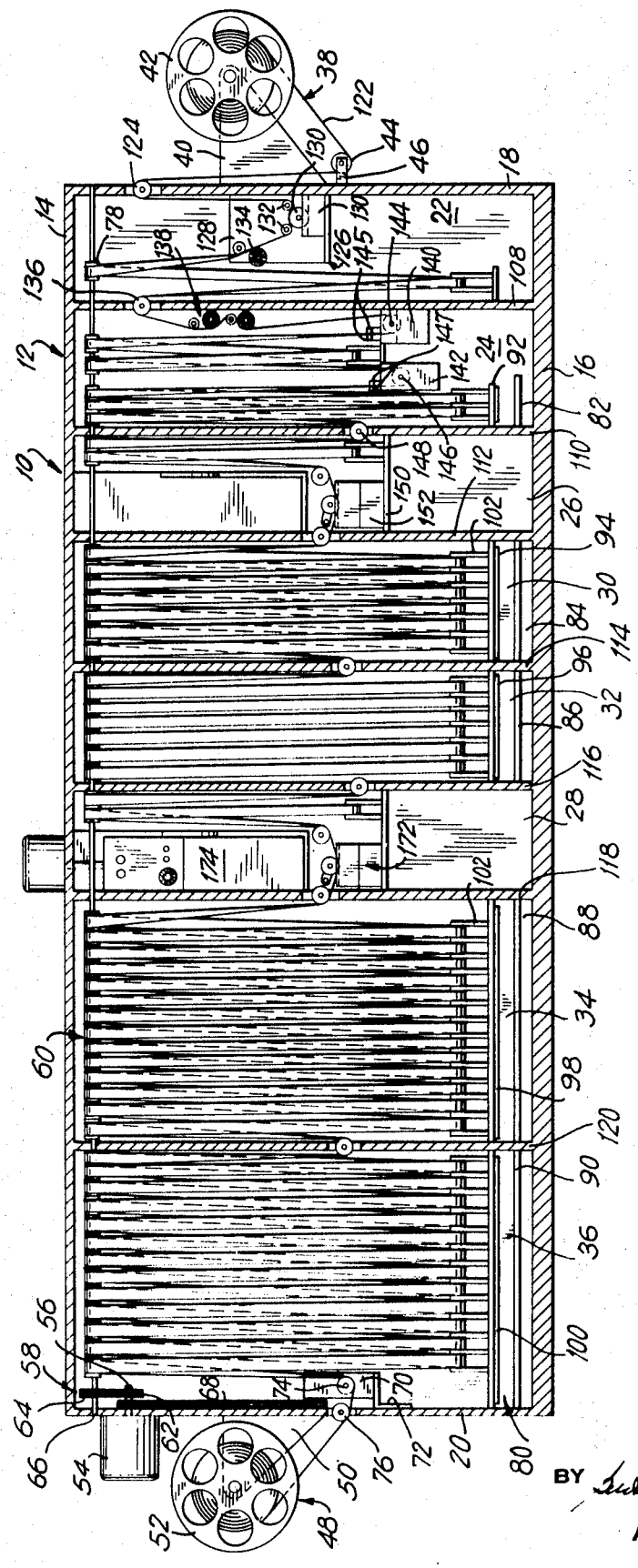
FIG. 1 is an elevational view of apparatus for treating film constructed in accordance with the principles of the invention.

With reference now to FIG. 1 of the drawings, there is illustrated therein apparatus for treating film constructed in accordance with the principles of the present invention, and generally designated by the reference character 10. The film treating apparatus 10 comprises a housing 12, the specific dimensions of which are not important to the present invention.

The housing 12 comprising a top wall 14, a bottom wall 16, a first end or sidewall 18, and a second end or sidewall 20. The housing 12, further, comprises a plurality of treating chambers 22, 24, 26 and 28, and a plurality of drying chambers 30, 32, 34 and 36. The treating chambers 22, 24, 26 and 28, and the drying chambers 30, 32, 34 and 36 will be described in greater detail hereinafter.

A film feeding station generally designated by the reference character 38 is structurally operatively associated with the first end or sidewall 18 of the housing 12. The station 38 comprises a bracket 40 fixedly mounted on and with respect to the sidewall 18, and a feed spool or reel 42 rotatably mounted on and with respect to the bracket 40. A tension roller 44 is mounted upon and with respect to the end or sidewall 18 in any suitable manner, as through the medium of a bracket 46.

With continued reference to FIG. 1 of the drawings, the housing 12 further comprises a film pickup station generally designated by the reference character 48 structurally operatively associated with the second or sidewall 20. The film station 48 comprises a bracket 50 mounted upon and with respect to the sidewall 20 in any suitable manner, and a film takeup reel or spool 52 is rotatably mounted upon the bracket 50 in any suitable manner. A film takeup reel or spool 52 is adapted to be positively driven in a film-winding direction at a constant rotational speed. Accordingly, there is further provided a constant torque motor 54 mounted upon and with respect to the end or sidewall 20. The constant torque motor 54, which may be of any suitable and conventional construction, has a motor shaft 56 that extends into the housing 12 and, more particularly, into the heating chamber 36. A gear assembly generally designated by the reference character 58 is located in the housing 12, and particularly within the heating chamber 36, and is particularly adapted to transmit constant torque to the film-winding station 48, and also to a film-transporting assembly generally designated by the reference character 60. The film-transporting assembly 60 will be described in greater detail hereinafter, but it will be understood that in order to transmit constant rotational torque to this assembly from the motor 54, the gear assembly 58 comprises a gear 62 nonrotatably mounted upon the motor shaft 54 disposed in gear-transmitting relationship with respect to a gear wheel 64 that is nonrotatably mounted upon a shaft 66 of the film-transporting assembly 60.

In order to transmit constant rotational torque from the motor 54 to the film takeup station 48, the gear assembly 58 further comprises an endless belt arrangement 68 which may be of any suitable and conventional construction operatively associated with a transmission 70 mounted within the housing 12, and particularly in the heating chamber 36, upon the end or sidewall 20 in any suitable manner, as through the medium of an L-shaped bracket 72. The transmission 70 transmits the constant torque of the motor 54, through the medium of the endless belt arrangement 68, to a driving wheel 74 which drives or transports the film past a tension roller 76 and on to the takeup reel or spool 52 of the takeup station 48.

It is emphasized that the film transporting assembly 60 and the film windup station 48 must travel at a uniform of velocity in order to achieve optimum results. The means whereby this is accomplished, as just hereinbefore described, disclosed, shown and illustrated, is exemplary only, and the present invention is not to be limited thereby. Other arrangements may be utilized, as long as the film windup station 48 and film-transporting assembly 60 travels at a uniform velocity.

The film transporting assembly 60 comprises a shaft 66, as hereinbefore set forth, which is positively rotatably driven by the constant torque motor 54 through the gear assembly 58. A plurality of sprocket wheels 78 are each nonrotatably mounted upon the shaft 66. One such sprocket wheel is nonrotatably mounted upon the shaft 66 within the chamber 22, a plurality of such wheels are nonrotatably mounted upon the shaft 66 within the treating chambers 24, 26 and 28, and a plurality of such sprocket wheels 78 are nonrotatably mounted upon the shaft 66 in each of the drying chambers 30, 32, 34 and 36. The number of such sprocket wheels 78 nonrotatably mounted upon the shaft 66 in each of the chambers may be varied as desired, and the particular number disclosed, described, shown and illustrated herein is by way of example only, and not by way of limitation.

The film transporting assembly 60 further comprises a subassembly generally designated by the reference character 80 that is constructed and arranged to automatically and instantaneously stop the motor 54 if there is a break anywhere along the length of the film. The subassembly 80, which may hereinafter be denoted as a stop assembly, a limit assembly, a shorting assembly, or the like comprises a plurality of lower, stationary plates 82, 84, 86, 88 and 90 mounted, respectively, in each of the chambers 24, 30, 32, 34 and 36. The assembly 80 further comprises a plurality of upper, moveably plates 92, 94, 96, 98 and 100 mounted, again respectively, in each of the chambers 24, 30, 32, 34 and 36. As herebefore pointed out, the lower plates 82–90 are stationary within each of their respective chambers, and may be fixedly mounted therewithin in any suitable manner. The plates 92–100, as also hereinbefore pointed out, are moveable. More particularly, and with particular reference now to FIG. 4 of the drawings, the plates 92–100 are disposed in a suspended relationship within each of their respective chambers through the medium of the shaft 66, the sprocket wheels 78 nonrotatably mounted thereupon, and the film. To that end, and as is clearly illustrated in FIG. 4 of the drawings, each of the upper, moveable plates comprises a plurality of upstanding legs or brackets 102 extending upwardly therefrom. In FIG. 4 of the drawings, for exemplary purposes only, there is illustrated the stationary plate 86 disposed within the chamber 32, and the upper, moveably plate 96. A shaft 104 extends through all of the brackets 102 extending upwardly from the moveable plate 96, and rotatably mounted upon the shaft 104 and between each pair of the brackets 102 is a sprocket wheel generally designated by the reference character 106 which may be substantially the same as or similar to the sprocket wheel 78. The sprocket wheel 106 will be described in greater detail hereinafter.

It is now considered apparent to anyone skilled in the art to which the present invention pertains that should the film in any of the chambers 24, 26, 28, 30, 32, 34 or 36 break, the shaft 66, the sprocket wheels 78 and the film will no longer be able to retain the suspended plate in the particular chamber in which the break occurs in its suspended relationship with respect to the plate 82, 84, 86, 88 or 90. The suspended plate will descend upon their occuring a break in the film, until the descending plate comes into contact with one of the stationary plates 82, 84, 86, 88 or 90. The plates 82–90, and the plates 92–100 are electrically connected into a circuit that includes the motor 54 in such a manner (not shown) as to "short" the motor 54, causing it to automatically and instantaneously cease operation, immediately upon one of the plates 92–100 coming into contact with one of the plates 82–90, respectively. This may be accomplished in any suitable and conventional manner, and thus it is not considered necessary to burden the description of this invention with exemplary electrical circuits.

The chamber 22 is defined by the first end or sidewall 18 and a chamber wall 108. The chamber 24 is defined by the wall 108 and another chamber wall 110. In turn, the chambers 26, 30, 32, 28, 34 and 36 are defined by the chamber wall 110, and by chamber walls 112, 114, 116, 118 and 120, respectively, along with the second end or sidewall 20.

As hereinbefore pointed out, the chambers 22, 24 26 and 28 are treating chambers. The chambers 30, 32, 34 and 36 are heating chambers. With reference once again to FIG. 1, the film, which can now be designated by the reference character 122, as it is unwound from the feeding reel or spool 42, and passes about the tension roller 44, is passed over and about another tension roller 124 and enters into the first treating chamber 22. First means generally designated by the reference character 126 for treating the celluloid side of the film 122 is disposed within this first treating chamber 22. A shelf 128 is mounted within the treating chamber 22 in any suitably and conventional manner. A tank or container 130 is positioned upon the shelf 128 and contains an alcohol bath for treating the celluloid side of the film. To that end, a treating wheel 130 is rotatably mounted with respect to the shelf 128, the surface of which is defined by a felt material. The film 122 is passed over the surface of the treating wheel 130 by means of a plurality of guide rollers 132. At this point, it is noted that the film does not pass into or through the alcohol bath contained within the tank 130, but passes only over the surface of the treating wheel 130, enabling the felt material defining the surface of that wheel to apply the alcohol bath to the film. Accordingly, it is the felt material defining the surface of the treating wheel 130 that passes through the alcohol bath in the container 130 so that the celluloid side of the film is treated and buffed at this first treating stage.

The film 122 is then passed about the surface of a rotatable brush 134. The brush may be constructed of any suitable and conventional materials, chosen particularly to enable the brush to remove dirt from the film 122 and also to function as an aid to dry.

The film 122 then passes about the surface of a tension roller 136, from once it is transported to a series or plurality of brushes generally designated by the reference character 138. The brushes 138 may be constructed of any suitable and conventional material, chosen to remove any dirt particles from the emulsion and celluloid surfaces of the film. These brushes 138 are disposed within the second treating chamber 24 in any suitable and conventional manner. Also disposed within this treating chamber are a plurality of solvent baths 140 and 142. Each bath 140 and 142 comprises a tank of any suitable and conventional construction mounted within the treating chamber 24 in any suitable manner. A cleaning solvent is disposed within the baths 140 and 142, and tension rollers 144 and 146 are positioned relative to the baths 140 and 142 so that the film 122, as it passes about the tension rollers 144 and 146, are subjected to the cleaning action of the solvent disposed within the containers of each bath.

It is desirable, before the film reaches the third treating chamber 26, to pass the film through a system or assembly for removing a liquid therefrom. To that end, such an assembly may comprise squeegee rollers 145 and 147 mounted within the treating chamber 24 and positioned on both sides of the film 122 immediately after the baths 140 and 142, respectively. The rollers 145 and 147 may be mounted in any suitable and conventional manner.

The film 122, after it passes about the tension roller 148 is passed into the third treating chamber 26. This treating chamber is particularly adapted to treat the celluloid side of the film. Thus far, it is the celluloid side of the film 122 that has been subjected to treatment (with the exception that the series or plurality of brushes 138 treated both the emulsion and celluloid surfaces of the film to remove dirt particles therefrom, as hereinbefore set forth), and, therefore, there has been no need to reverse the film. With continued reference now to FIG. 1, and also with reference to FIGS. 2 and 3, there is disposed in the treating chamber 26 a shelf 150 fixedly positioned therewithin in any suitable manner, upon which there is disposed a treating bath or tank 152. The bath or tank 152 is adapted to be substantially filled with a celluloid dissolving chemical solution or bath 154. The celluloid side of the film 122 is adapted to be treated with this solution or bath, and to that end there is suitably mounted within the treating chamber 26, a tension roller 156, and another tension roller 158 mounted with respect to the wall 112 that, in part, defines this treating chamber. A treating wheel 160 is also mounted within the chamber 26 and is constructed and arranged to apply a bath or solution 154 to the celluloid surface of the film in a manner presently to be described. A guide or positioning roller 162 is disposed within the chamber 26, and is constructed and arranged, in a manner also presently to be described, to guide the film 122, and particularly the celluloid surface or side thereof to a position in which it will be subjected to the treatment of the celluloid bath or solution 154. A guide roller 162 comprises a tension bar or arm 164 which applies the necessary tension to the film 122 as it is passed between the tension rollers 156 and 158, and subjected to the treatment of the bath or solution 154 through the medium of the wheel or roller 160.

With particular reference now to FIG. 3 of the drawings, it will be understood, and it is to be emphasized that the treatment wheel or roller 160 is defined by a concave surface 163 completely about the periphery thereof. As a result, as the treatment wheel 160 is rotatably moved through the bath or solution 154 (the wheel 160 may be mounted within the treating chamber 26 in any suitable and conventional manner, as hereinbefore set forth, as through the medium of a shaft 166), a small amount of the bath or solution 154 is retained by the concave surface or periphery 163 of the wheel 160, thus defining a meniscus of fluid 164 for treatment of the celluloid side or surface of the film 122 as it passes from the tension roller 156 to the roller 158 between the treatment wheel 160 and the guide wheel or roller 162.

With respect to the guide wheel or roller 162, it is a salient feature of the present invention that this wheel or roller is constructed and arranged to present a plurality of film transporting surfaces 166 and 168. The width of these surfaces 166 and 168 are different than one another, thus enabling films 122 of different sizes (for example, 35 mm., 70 mm., and the like) to pass thereabout. It is to be understood, that the width of each surface 166 and 168 is less than the width of the size film particularly adapted to pass about a respective one of those surfaces so that the guide roller or wheel 162 will cause the film 122 to bow or take on a convex shape or configuration, as clearly illustrated in FIG. 3 of the drawings, the degree of curvature of which will correspond generally with the degree of curvature of the concave surface 163 of the treating wheel 160. At this point, and as hereinbefore pointed out, the guide roller or wheel 162 may be positioned within the treating chamber 26 in any suitable and conventional manner, and, in the example illustrated in FIG. 3 of the drawings, this is accomplished through the medium of a suitable shaft 170. At this point, it is to be understood that the spacing between the shafts 166 and 170 is another salient feature of the present invention, and, more particularly, is chosen so that the film 122, as it passes between the treating wheel 160 and the guide roller or wheel 162 will not touch the concave surface 163, but, rather, the celluloid surface of the film will be subjected only to a light wiping action of the bath or solution 154 defined by the meniscus of fluid 164. It is to be noted that the degree of curvature of the film 122 if it passes across the surface 166 of the wheel or roller 162 will be slightly different than that illustrated in FIG. 3 of the drawings, wherein the film is shown as passing across the film transporting surface 168. It is to be understood, therefore, that when the degree of curvature of the film 122 is said to correspond to the degree of curvature of the surface 163 of the treating wheel 160, this terminology is intended in the broadest possible sense, and more particularly, it is to be interpreted to include within the scope thereof the degree of curvature of the film corresponding generally, or substantially corresponding with the degree of curvature of the surface 163.

The celluloid dissolving chemical solution or bath 154 contained within the tank or container 152 may be of any suitable and conventional formulation, and, more particularly, consists of a formulation or solution particularly adapted to melt the top layer of celluloid from the celluloid side of the film 122 to remove scratches therefrom. After the celluloid side of the film is treated within the treating chamber 26, it exits therefrom, passing about the tension roller 158, and enters into and passes through the heating chambers 30 and 32. Tension rollers (not designated by reference characters) are suitably mounted upon the chamber walls 114 and 116 to assist and guide in the transporting of the film through the heating chambers 30 and 32. The heating chambers may be supplied with the desired degree of heat in any suitable and conventional manner.

The film then enters into the treating chamber 28. It is not deemed necessary to reiterate the details of construction with respect to the treating chamber 28, except to say that there is disposed within this fourth and last treating chamber an emulsion swelling bath generally designated by the reference character 172. This bath may be of any suitable and conventional formulation, and, more particularly, is a formulation chosen to act upon the emulsion side of the film 122 to cause a swelling thereof. Then, when the film exits from the treating chamber 28, and enters into and passes through the heating chambers 34 and 36, the film is dried, and abrasions, scratches, and other surface markings on the emulsion side of the film are filled in. At this point, it is to be noted that, since it was the celluloid side of the film treated in the third treating chamber 26, and since it was the emulsion side of the film treated in the fourth and last treating chamber 28, that the surfaces of the film have to be reversed as it is transported through the heating chambers 30 and 32. This is accomplished in any suitable manner, particularly when the film is initially threaded through the apparatus 10 of this invention.

A control assembly generally designated by the reference character 174 is disposed at the treating chamber 28. It is at this point that the normal functions of the apparatus 10 are chosen and controlled by the operator. It is not deemed necessary to describe in detail the construction of this control center or apparatus.

In the use of apparatus constructed in accordance with the principles of the present invention, which are now considered readily apparent to those skilled in the art to which the present invention pertains, the film 122 may be threaded into and through the apparatus in any suitable and conventional manner. At this point, and as hereinbefore pointed out, it is to be noted that apparatus 10, constructed in accordance with the principles of the present invention, will treat film of various sizes, such as 35 mm., 70 mm., and the like, and, to that end, reference is once again made to the sprocket wheels 78 and 106. Similarly with respect to the guide or positioning wheels or rollers 162, the sprocket wheels 78 and 106 have different size film-transporting surfaces comprising sprocket teeth 176 (as shown in FIG. 4 of the drawings) to insure that the film 122 is properly transported thereabout, and is not accidentally dislodged therefrom.

It will be apparent to those skilled in the art that it will be extremely tedious and time consuming to thread each reel of film separately through the apparatus 10. This problem is readily solved by securing the beginning or leader portion of one of the reels of film to the end portion of a reel of film which has been processed through the apparatus 10, whereby once the apparatus is threaded it is not necessary to rethread each new reel of film therethrough. The beginning and end portions of the two reels of film may be temporarily secured by any suitable means such as stapling, taping and the like.

From the foregoing, it is seen that the present invention provides a method and apparatus for treating film which fully accomplishes its intended objects and is well adapted to meet practical conditions of manufacture, installation and use.

Although the present invention has been described in some detail by way of illustration and example for purposes of clari-

What is claimed is:

1. The method of treating film comprising at least the steps of treating the celluloid side of the film with a celluloid dissolving chemical solution to remove scratches, surface abrasions, and the like, and treating the emulsion side of the film to an emulsion swelling bath to fill in scratches, surface abrasions, and the like on the emulsion side of the film when it is dried.

2. The method as defined in claim 1, comprising the additional step of drying the film after treating the emulsion side with the emulsion swelling bath.

3. The method as defined in claim 1, comprising the additional steps of passing the film through an alcohol bath before treating the celluloid and emulsion sides of the film to treat and buff the celluloid side, and removing dirt particles from the emulsion and celluloid surfaces.

4. The method as defined in claim 1, comprising the additional steps of treating and buffing the celluloid side of the film by passing it through an alcohol bath before treating the celluloid side with said celluloid dissolving chemical solution, and the emulsion side with said emulsion swelling bath, applying a brushing action to the emulsion and celluloid sides or surfaces to remove dirt particles therefrom, and applying a cleaning solvent thereto.

5. Apparatus for treating film comprising, in combination, a plurality of treating chambers, and a plurality of heating chambers, at least one of said treating chambers comprising means for treating the celluloid side of said film with a celluloid dissolving chemical solution to remove scratches, surface abrasions, and the like therefrom, and at least an other of said treating chambers comprising means for treating the emulsion side of said film with an emulsion swelling bath to fill in scratches, surface abrasions, and the like, thereon, and at least one of said heating chambers comprising means for heating film between applying the celluloid dissolving chemical solution and the emulsion swelling bath to the celluloid and emulsion surfaces, respectively, thereof.

6. Apparatus defined in claim 5, wherein an other of said treating chambers comprises means for applying an alcohol bath to the celluloid side of the film to treat and buff the same.

7. Apparatus as defined in claim 5, wherein an other of said treating chambers comprises means for applying an alcohol bath to the celluloid side of the film to treat and buff the same, and means for applying a brushing action to the emulsion and celluloid surfaces of the film to remove dirt particles therefrom.

8. Apparatus as defined in claim 5, wherein an other of said treating chambers comprises means for applying an alcohol bath to the celluloid side of the film to treat and buff the same, means for applying a brushing action to the emulsion and celluloid surfaces of the film to remove dirt particles therefrom, and means for applying a cleaning solvent to the film.

9. Apparatus as defined in claim 5, wherein said means for applying said celluloid dissolving chemical solution to the celluloid surface of the film, and said means for applying said emulsion swelling bath to the emulsion surface of the film comprises a treating wheel and a film guide wheel, said film being particularly adapted to be transported between said guide wheel and said treating wheel, and said treating wheel being constructed and arranged to apply a meniscus of fluid to the surfaces of the film.

10. Apparatus as defined in claim 5, wherein said treating wheel comprises a surface of concave configuration, said treating wheel being rotatably mounted to pass the concave surface through the fluid comprising the celluloid dissolving chemical solution in one of said treating chambers, and through the emulsion swelling bath in another of said treating chambers, enabling the concave surface of the treating wheel to develop a meniscus fluid to be presented to the film as it is passed between the treating wheel and the guide wheel and said guide wheel being constructed and arranged to cause the film, as it is passed between the guide wheel and the treating wheel, to assume a convex configuration the rate of curvature of which corresponds generally with that of the rate of curvature of the concave surface of the treating wheel.

11. Apparatus as defined in claim 5, wherein the distance between the center of the guide wheel and the center of the treating wheel precludes the surface of the film as it is being passed therebetween from coming into contact with the surface of the treating wheel, enabling the surface of the film to be subjected to a gentle wiping action of the meniscus of fluid developed by the concave surface of the treating wheel.

12. Apparatus as defined in claim 11, wherein said means for applying a celluloid dissolving chemical solution to the celluloid surface of the film, and said means for applying an emulsion swelling bath to the emulsion surface of the film comprises, further, a plurality of tension rollers, and wherein said guide wheels comprise a tension bar.

13. Apparatus as defined in claim 11, wherein said guide wheels are constructed and arranged to enable the transport of different widths of film between said guide wheels and said treating wheels, and wherein the rate of curvature of the convex configuration of the film caused by the construction and arrangements of the guide wheels corresponds generally with the rate of curvature of the concave surface of the treating wheels irrespective of the width of the film.

14. Apparatus as defined in claim 5, further comprising means for transporting said film through said apparatus at a uniform velocity, and means for automatically and substantially immediately causing the transportation of the film through said apparatus to cease upon a break or fissure occuring therein.

15. An assembly for bathing or applying a solution to film comprising a container particularly adapted to have disposed therewithin a solution or bath, a treating wheel rotatable therewithin, and having a concave surface for developing a meniscus of fluid thereabout, and a guide wheel constructed and arranged to cause film, as it is transported between the said guide wheel and the treating wheel to assume a convex configuration, the rate of curvature of which corresponds generally with the rate of curvature of the concave surface of the treating wheel, and said guide wheel and treating wheel being spaced apart a distance to preclude the film from coming into contact with the concave surface of the treating wheel, enabling the film to be subjected to a gentle wiping action of the meniscus of fluid developed thereby.

16. The assembly as defined in claim 15, wherein said guide wheel is constructed and arranged to enable film having different widths to be transported between said guide wheel and said treating wheel, and is constructed and arranged, further, to enable the rate of curvature of the convex surface of the film to remain generally the same as the rate of curvature of the concave surface of the treating wheel.